Feb. 5, 1952 J. W. WILKINSON 2,584,771
METHOD OF MAKING FILTER CARTRIDGES
Filed July 26, 1946 2 SHEETS—SHEET 1

INVENTOR.
James W. Wilkinson
BY
Attorney.

Feb. 5, 1952   J. W. WILKINSON   2,584,771
METHOD OF MAKING FILTER CARTRIDGES
Filed July 26, 1946

INVENTOR.
James W. Wilkinson
BY
Attorney.

Patented Feb. 5, 1952

2,584,771

UNITED STATES PATENT OFFICE 2,584,771

METHOD OF MAKING FILTER CARTRIDGES

James W. Wilkinson, Hastings, Mich., assignor to Hastings Manufacturing Company, Hastings, Mich.

Application July 26, 1946, Serial No. 686,547

5 Claims. (Cl. 226—19)

This invention relates to improvements in filter cartridges and method of making.

This invention relates particularly to method of making filter cartridge for the oil filter of an internal combustion engine, but may be applied to other types of filter cartridges. The cartridge illustrated is intended to be used in the oil filter shown in my copending application, Serial No. 686,546, filed July 26, 1946, for Oil Filters; now Patent Number 2,511,800 as of June 13, 1950.

The principal objects of the invention are:

First, to provide a means and method for filling the cartridge with filtering material of a uniform density throughout the body of the cartridge.

Second, to provide novel and economical means for forming a seal at the ends of the cartridge.

The drawings, of which there are two sheets illustrate a preferred form of the cartridge together with the method for manufacturing the cartridge and one modified form of cartridge.

Figure 1:
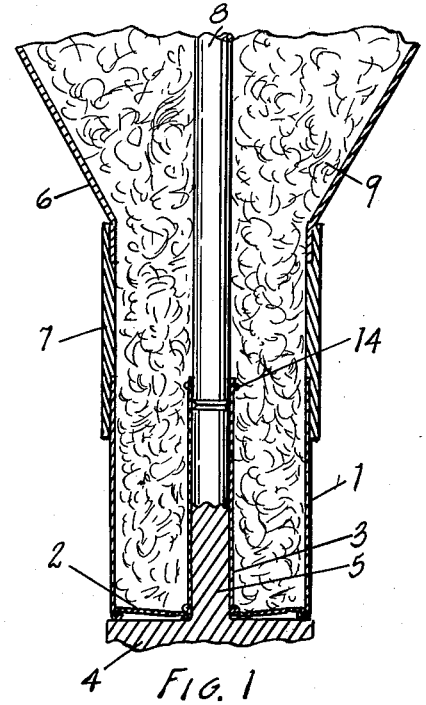
Fig. 1 represents a vertical cross-sectional view showing the beginning of the filling operation.

It has previously been proposed to make filter cartridges from cotton string, waste, cellulose fibres, and other absorbent materials. It has further been proposed to pack the filtering material in the cartridge to obtain better filtering results. I have found that untreated cotton linters packed to a uniform density of 180 to 275 grams per 65 cu. in. of space gives improved filtering capacity. The untreated or unkiered linters have a high natural wax content, none of which has been removed by mechanical or chemical treating processes. This renders the linters less susceptible to moisture in the oil. Since water repellent material is far superior to water saturated fibres in attracting contaminants in the oil, the linters will filter out more of the carbon and metal particles, asphaltines, and resinous matter appearing in the oil from operation of the engine, and more of the air borne particles picked up from the air outside of the engine.

Since a mass of cotton linters has a fluffy spring or resilient characteristic, it is impossible to obtain a uniform density within the cartridge by a single pressing operation. I have, therefore, provided a press in which are mounted a pair of small cylindrical tamps, arranged to reciprocate below the main press and pack the linters within the body of the cartridge before the top of the mass is pressed into the cartridge. I have also provided a top for the cartridge which may be applied to the top of the resilient mass of linters for finally compressing them to the proper density before sealing the cartridge.

As shown in the drawings, the cartridge consists of a cylinder body or side wall member 1 provided with a bottom 2 which is secured to the body by seaming or crimping before the filling operation begins. The center of the bottom is apertured to receive the oil return pipe 3 which is secured to the bottom by seaming or crimping before the filling process begins. Both the body and the pipe are perforated for the passage of oil therethrough.

Figure 2:
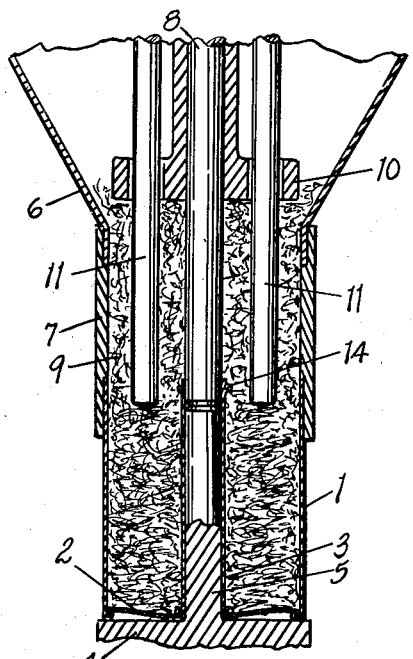
Fig. 2 represents a vertical cross-sectional view showing an intermediate tamping and packing operation.

The filling process consists of placing the body on a base 4 provided with a vertical pin 5 which fits inside the oil return pipe and prevents the linters from being packed therein. A funnel-shaped hopper 6 is then fitted over the upper end of the body with the intermediate sleeve or neckpiece 7 engaging the end of the body. A guide rod 8 extends downwardly into the upper end of the return oil pipe and a sufficient amount of loose cotton linters to obtain a final ratio of between 180 and 275 grams per 65 cu. in. are fed into the funnel, as indicated at 9 in Fig. 1. A tamping head 10 is then lowered around the guide rod 8 as shown in Fig. 2 and the tamping bars 11 which extend through the tamping head are reciprocated to tamp the linters in the bottom of the body. After the linters are packed uniformly up from the bottom of the body, the tamp 10 is lowered to compress the top of the mass of linters to the level of the top of the body. The operator should desirably rotate the body on the pin 5 so that the rods 11 can be brought into contact with all the linters around the oil return pipe.

Figure 3:
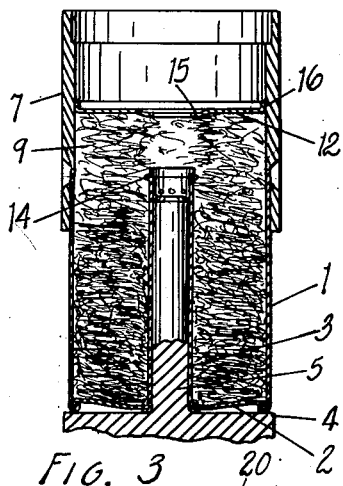
Fig. 3 represents a vertical cross-sectional view showing the final packing and capping operation.

After the linters have been packed into the body, the filling funnel and tamp are removed and a cover 12 is inserted in the sleeve 7 (see Figs. 3 and 4) and pressed down by the plunger 13 against the bead 14 formed near the upper end of the oil return pipe. The cover 12 has been preformed to have an annular depressed flange 15 in its center and an upturned flange 16 around the outer edge thereof. The plunger 13 is provided with a central pin 17 which fits into the oil return pipe and which is tapered as at 18 to flare out the upper end of the oil return pipe over the annular flange on the cover.

Figure 5:
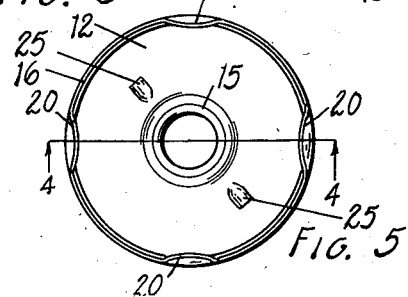
Fig. 5 represents a top view of the cartridge after the first sealing operation shown in Fig. 4.
Figure 4:
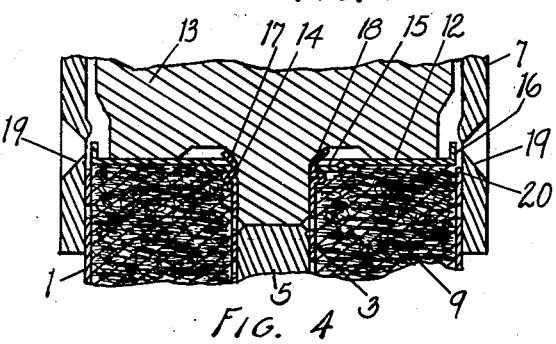
Fig. 4 represents a partial cross-sectional view showing the first step in sealing the top of the cartridge.
Figure 6:
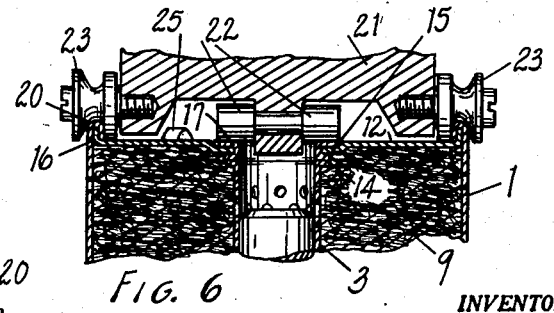
Fig. 6 represents a vertical cross-sectional view showing the final sealing operation.
Figure 7:
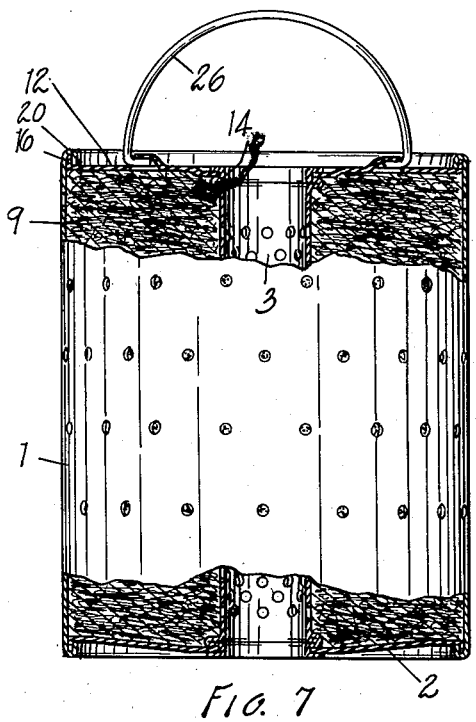
Fig. 7 represents an elevational view partially broken away showing the completed cartridge.

The sleeve 7 is provided with four cut-outs 19, the upper edges of which are arranged to bend over the upper edge of the container at four places as indicated at 20 in Figs. 4 and 5. After the plunger 13 has clamped the top of the oil return pipe over the cover, the sleeve 7 is pressed downwardly to set the outer edges of the cover in place.

After the cover is temporarily held in place, the body is placed under a spinning or seaming head 21 which is provided with the center rollers 22 and the grooved outer rollers 23. The spinning or seaming head is pressed tightly against the top of the body and rotated to roll the upper end of the oil return pipe flat against the annular flange of the cover and to crimp or seam the upper edges of the body around the outer flange of the cover. The cover 12 is preferably formed with a pair of upwardly pressed ears 25 as shown in Fig. 5 to permit the securing of a wire handle to the cartridge. The handle 26 is used in installing and removing the cartridge from the filter housing.

Figure 8:
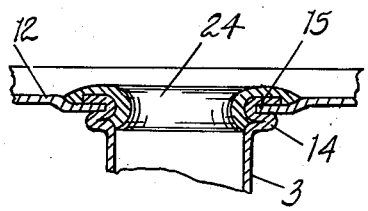
Fig. 8 represents an enlarged cross-sectional view showing the seal used at each end of the cartridge.

After the cartridge has been filled and closed in the manner just described, an annular sealing gasket 24 is formed around each end of the oil return pipe (see Fig. 8) by spraying or painting a liquid sealing compound of oil resistant material on the metal pipe. The material used is a synthetic rubber material which will adhere to the metal and which will harden into a compressible mass. The commercial product "neoprene" is a good example of the material to be used.

Figure 9:
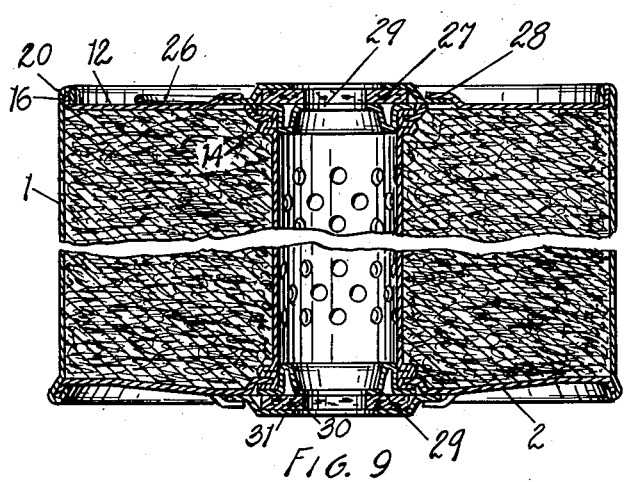
Fig. 9 represents a vertical cross-sectional view through a modified form of cartridge.
Figure 10:
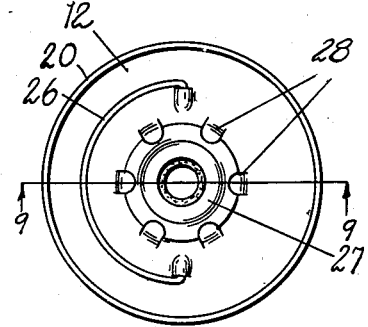
Fig. 10 represents a plan view of the cartridge illustrated in Fig. 9.

In the modified form of the cartridge shown in Figs. 9 and 10 the filling operation is carried out in the same manner as was just described, but the neoprene seals are omitted and the cork or other fibre seals 27 are applied to the cartridge after it has been filled. The top and bottom of the cartridge are formed with annularly disposed series of pressed-out ears 28. Seats 29 having inwardly extending, return bend, annular flanges are inserted in the ends of the oil return pipe. Annular disks 30 of cork or other seal material are placed over the seats and held in place by the retaining disks 31. The retaining disks are secured in place by bending down the ears 28 over the outer edges thereof.

The invention has been illustrated and described in a highly practical commercial embodiment thereof. There has been no attempt to show further adaptations, as it is believed that this disclosure will enable those skilled in the art to adapt the invention as may be desired.

Having thus described the invention, what is claimed as new and desired to secure by Letters Patent is:

1. The method of forming a filter cartridge enclosed in a cylindrical body with a bottom wall and a central pipe secured to said bottom wall which comprises the steps of, placing said body under a funnel, introducing fibrous filtering material in natural unrestrained bulk form through said funnel, tamping said material first with a small rod and then with a tamp covering substantially the whole area of said body, pressing a top wall into said body and around the end of said pipe, turning part of the end of said pipe outwardly of said top wall and folding a portion of the top of said body inwardly over said top wall simultaneously with the pressing of said top wall into said body, and crimping the edges of said body and the top of said pipe on said top wall.

2. The method of forming a filter cartridge enclosed in a cylindrical body with a bottom wall and a central pipe secured to said bottom wall which comprises the steps of, placing a sleeve on top of said body, placing a funnel on said sleeve, introducing fibrous filtering material in natural unrestrained bulk form through said funnel, tamping said material with a small rod extending into said body, passing a tamp covering substantially the whole area of said body down said sleeve, pressing a top wall into said body and around the end of said pipe and simultaneously turning the end of said pipe outwardly over said top wall and folding a portion of the top of said body inwardly over said top wall, and then crimping the edges of said body and the top of said pipe on said top wall.

3. The method of forming a filter cartridge enclosed in a cylindrical body with a bottom wall and a central pipe secured to said bottom wall which comprises the steps of, placing a sleeve and a superimposed funnel on said body, introducing filtering material in natural unrestrained bulk form through said funnel, tamping said material with a small rod, pressing a top wall into said body and around the end of said pipe with a plunger and simultaneously pressing the end of said pipe outwardly of said top wall with said plunger, pressing a portion of the top of said body inwardly over said top wall with said sleeve, and then removing said sleeve and crimping the edges of said body and the top of the pipe over said top wall.

4. The method of filling a filter cartridge comprising the steps of placing an extension on said cartridge, then filling said cartridge and said extension with loose cotton linters and tamping said linters with a small tamp that penetrates into said cartridge, passing an end wall through said extension into said cartridge and bending a portion of said cartridge to hold said end wall in place, and then removing said extension and seaming said cartridge to said end wall to form a closed end.

5. The method of filling a filter cartridge with a central return pipe comprising the steps of placing an extension on said cartridge, filling said extension and said cartridge with loose fibrous material, tamping said material with a tamp that penetrates the mass of material within said cartridge to compact the material located near the bottom of the cartridge, passing an end wall through said extension into said cartridge and around said pipe to press said material from said extension into said cartridge, bending a portion of said cartridge and said pipe to hold said end wall in place, and rolling said cartridge and the end of said pipe over said end wall.

JAMES W. WILKINSON.

(References on following page)

REFERENCES CITED

The following references are of record in the file of this patent:

UNITED STATES PATENTS

| Number | Name | Date |
|---|---|---|
| 2,031,935 | Cuno | Feb. 25, 1936 |
| 2,031,936 | Cuno | Feb. 25, 1936 |
| 2,046,366 | Collins | July 7, 1936 |
| 2,046,367 | Collins | July 7, 1936 |
| 2,127,982 | Northup | Aug. 23, 1938 |
| 2,203,495 | Kamrath | June 4, 1940 |
| 2,380,033 | Aldhaui | Apr. 14, 1942 |
| 2,314,640 | Winslow et al. | Mar. 23, 1943 |
| 2,334,664 | Wicks | Nov. 16, 1943 |
| 2,345,849 | Winslow et al. | Apr. 4, 1944 |
| 2,349,174 | Kunkhammer | May 16, 1944 |
| 2,372,290 | Pawelsky et al. | Mar. 27, 1945 |